United States Patent
Kaneko et al.

(10) Patent No.: US 7,575,382 B2
(45) Date of Patent: Aug. 18, 2009

(54) COATING/DEVELOPING APPARATUS AND OPERATION METHOD THEREOF

(75) Inventors: Tomohiro Kaneko, Koshi (JP); Akira Miyata, Koshi (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 12/166,470

(22) Filed: Jul. 2, 2008

(65) Prior Publication Data
US 2009/0021704 A1   Jan. 22, 2009

(30) Foreign Application Priority Data
Jul. 19, 2007   (JP) .............................. 2007-187874

(51) Int. Cl.
*G03D 5/00* (2006.01)
*G03B 27/32* (2006.01)
*G06F 19/00* (2006.01)

(52) U.S. Cl. .......................... 396/611; 355/27; 700/112; 700/121

(58) Field of Classification Search .................. 396/611; 355/27; 430/30, 311; 700/95, 112, 114, 700/117, 121
See application file for complete search history.

(56) References Cited

U.S. PATENT DOCUMENTS

2002/0037462 A1 * 3/2002 Ogata et al. ................... 430/30
2007/0056514 A1 * 3/2007 Akimoto et al. ............. 118/716
2007/0088450 A1 * 4/2007 Shinozuka et al. .......... 700/108

FOREIGN PATENT DOCUMENTS

JP   2005-175052   6/2005

* cited by examiner

*Primary Examiner*—Alan A Mathews
(74) *Attorney, Agent, or Firm*—Oblon, Spivak, McClelland, Maier & Neustadt, P.C.

(57) ABSTRACT

A coating/developing apparatus has a carrier block including a first transfer device, a process block including processing modules, an examination block including examination modules and a second transfer device, and first to forth stages. A controller executes a first operation mode preset to transfer substrates from the process block and carrier block into the examination block in parallel. The first operation mode includes transferring substrates processed by the process block to the third or fourth stage through or not through an examination module by the second transfer device, transferring substrates to be only examined from a carrier in the carrier block to the second stage by the first transfer device, and transferring these substrates from the second stage to an examination modules by the second transfer device, and transferring substrates thus examined from the examination block to the third or fourth stage by the second transfer device.

20 Claims, 10 Drawing Sheets

COATING/DEVELOPING APPARATUS AND OPERATION METHOD THEREOF

BACKGROUND OF THE INVENTION

1. Field of the Invention

The present invention relates to a coating/developing apparatus for performing a coating process of a resist liquid and a developing process after light exposure, on a substrate, such as a semiconductor wafer or an LCD substrate (a glass substrate for a liquid crystal display). The present invention also relates to an operation method and a storage medium used for the apparatus.

2. Description of the Related Art

In order to form a desired resist pattern on a substrate, such as a semiconductor wafer or LCD substrate, a resist liquid is applied onto the substrate to form a resist film, then the resist film is subjected to a light exposure process using a photo mask and a subsequent developing process. Such a series of processes are performed in a system including a coating/developing apparatus for performing resist liquid coating and development and a light exposure apparatus connected to the coating/developing apparatus.

The coating/developing apparatus includes a carrier block, a process block, and an interface block arrayed in a row. The carrier block is configured to place wafer cassettes thereon and includes a transfer arm for transferring semiconductor wafers (which may be referred to as wafers) to and from the wafer cassettes. The process block is configured to perform resist coating and developing processes and so forth on wafers. The interface block is connected to a light exposure apparatus.

After a resist pattern is formed on a substrate, predetermined examinations are performed on the substrate in terms of, e.g., the line width of the resist pattern, the overlapping state between the resist pattern and underlying pattern, and development defects. Then, only acceptable substrates as a result of the examinations are sent to the subsequent steps. These examinations may be performed in stand-alone examination units disposed independently of the coating/developing apparatus. However, it is convenient to adopt an in-line system including the coating/developing apparatus and examination units disposed in the apparatus.

In light of this, Jpn. Pat. Appln. KOKAI Publication No. 2005-175052 (see paragraph number [0042] and FIG. 4) discloses a system that includes an examination block interposed between a carrier block and a process block and provided with a plurality of examination units and a transfer arm. The system disclosed in this document is preset to perform transfer control called restart control in which substrates are transferred from the carrier block through the examination block into the process block, then the processed substrates are once returned into a carrier inside the carrier block, and then the substrates are transferred into the examination block and subjected to examinations.

FIG. 10 is a plan view schematically showing a coating/developing apparatus for performing the transfer control described above, which includes a carrier block 11, an examination block 12, a process block 13, and interface block 14 connected to a light exposure apparatus. FIG. 10 further shows wafer carriers 10, a transfer arm 15 disposed in the carrier block 11, and a transfer arm 16 disposed in the examination block 12. Transfer stages TRS1, TRS2, TRS3, and TRS4 and examination modules IM1, IM2, and IM3 are shown as being arrayed in the plan view for the sake of convenience, but the transfer stages are stacked one on top of the other to form a four-level structure and the examination modules are also stacked one on top of the other to form a three-level structure, for example.

In the coating/developing apparatus shown in FIG. 10, each wafer stored in a carrier 10 is transferred through a route of "transfer arm 15→TRS1→transfer arm 16→process block 13", so that the wafer is subjected to various processes necessary for resist coating performed by respective modules in the process block 13. Thereafter, the wafer is transferred from the interface block 14 to the light exposure apparatus. Then, the wafer is returned to the process block 13, and is subjected to various processes necessary for a developing process performed by respective modules. Thereafter, the wafer is transferred through a route of "transfer arm 16→TRS2→transfer arm 15" back into a carrier 10.

The wafers stored in the carrier 10 are preset to have a particular order for receiving processes such that, where 25 wafers are stored in the carrier 10, for example, they have serial numbers of No. 1 to No. 25 assigned thereto. The wafers are transferred into the process block 13 in this order from the lowest substrate number, and are then transferred through predetermined modules in the order. The process block 13 includes transfer arms (main arms) 17A and 17B that perform a cycle transfer to transfer wafers in the order while they are sequentially and cyclically moving among a series of predetermined modules.

On the other hand, after the wafers are returned to the carrier 10, all of or selected part of the wafers are transferred by the transfer arm 15 to the transfer stage TRS3, and are then transferred by the transfer arm 16 to the examination modules. For example, the wafers may include ones to be examined only by the examination module IM1, ones to be examined only by the examination module IM2, ones to be examined only by the examination module IM3, or ones to be examined by the examination module IM1 and then by the examination module IM2. After the wafers are examined by the examination modules IM1 to IM3, they are returned through the transfer stage TRS4 into the carrier 10. In other words, this transfer control is arranged to employ a so-called parallel transfer operation, in which a transfer (production flow) of wafers for performing the coating and developing processes and a transfer (examination flow) for performing the examinations are performed in parallel.

As described above, the examination modules IM1 to IM3 are configured to perform different examinations, and thus time periods necessary for the examinations differ from each other in general. Accordingly, even where wafers are loaded into the examination modules IM1 to IM3 at different timings, the examinations of the examination modules IM1 to IM3 may be finished at almost the same time. In this case, according to the restart control transfer described above, wafers need to wait for their turn to be transferred into the transfer stage TRS4, at the respective examination modules where the wafers have been examined, by a time period not less than one cycle time (the time necessary for the main arms 17A and 17B to circulate the transfer passage), and so the wafers cannot be smoothly unloaded from the examination modules IM1 to IM3. Further, where a wafer is waiting for its turn to be transferred into the transfer stage TRS4 after the examination, a new wafer cannot be loaded into this examination module IM. Accordingly, a delay in transfer into the examination module IM is caused, and thereby increases a time period in which the examination module IM is not used to examine a wafer. In other word, the examination module IM decreases its productivity, and the throughput is thereby lowered.

As a countermeasure against this problem, the number of transfer stages TRS disposed in the examination block 12 may be increased. However, in general, since the space within the examination block 12 is restricted, the number of transfer stages TRS to be disposed in the examination block 12 is limited, and so this countermeasure is not practical.

In the explanation described above, wafers are transferred from one carrier 10 to perform coating and developing processes thereon, then wafers are once returned into the carrier 10, and then the wafers are transferred to examination modules IM to perform examinations thereon. However, studies have been made to develop methods for effectively utilizing the examination modules IM in the examination block 12 while wafers are transferred from one carrier 10 to perform coating and developing processes thereon, as described above. In a method of this kind, in addition to the carrier 10, another or second carrier storing wafers to be only examined is placed in the carrier block 11, and each wafer stored in the second carrier is transferred through a route of "second carrier→TRS3→one or more examination modules IM→TRS4→second carrier". However, also in this case, since a plurality of examination modules IM are used, transfer of wafers to TRS4 may be retarded and the throughput is thereby lowered, depending on the timings when the examinations of the examination modules IM are finished.

BRIEF SUMMARY OF THE INVENTION

An object of the present invention is to provide a technique used for a coating/developing apparatus that includes both of a transfer route of substrates to be processed by coating and development and a transfer route of substrates to be only examined, wherein the technique can decrease the time for substrates to unnecessarily stay in one or more examination modules, thereby improving the throughput.

According to a first aspect of the present invention, there is provided a coating/developing apparatus comprising: a carrier block configured to place therein a carrier that stores a plurality of substrates, and including a first transfer device configured to transfer substrates to and from the carrier; a process block including a plurality of processing modules configured to perform resist coating on substrates transferred from the first transfer device and to perform development on substrates processed by the resist coating and light exposure, and a device configured to transfer substrates to and from the processing modules; an examination block including a plurality of examination modules configured to perform examinations on substrates, and a second transfer device configured to transfer substrates to and from the examination modules; a first stage, a second stage, a third stage, and a fourth stage configured to allow substrates to be transferred between the first transfer device in the carrier block and the second transfer device in the examination block; a controller configured to control the first transfer device in the carrier block and the second transfer device in the examination block, wherein the controller includes a function of executing a first operation mode preset to transfer substrates from the process block and substrates from the carrier block into the examination block in parallel, and the first operation mode comprises transferring substrates processed by the process block to either one of the third and fourth stages through or not through at least one of the examination modules by the second transfer device, transferring substrates to be only examined from a carrier in the carrier block to the second stage by the first transfer device, and transferring these substrates from the second stage to at least one of the examination modules by the second transfer device, and transferring substrates thus examined from the examination block to either one of the third and fourth stages by the second transfer device.

The first operation mode may comprise selecting empty one of the third and fourth stages to transfer a substrate thereto by the second transfer device. The controller may further include a function of executing a second operation mode preset to transfer substrates only from the process block into the examination block, and a mode selection part configured to select one of the first and second operation modes, and the second operation mode may comprise transferring substrates processed by the process block to any one of the second, third, and fourth stages through or not through at least one of the examination modules by the second transfer device. The second operation mode may comprise selecting empty one of the second, third, and fourth stages to transfer a substrate thereto by the second transfer device. A fifth stage and a sixth stage may be disposed between the process block and the examination block, and the controller may be preset to perform transferring a substrate from the first stage to the fifth stage by the second transfer device, and transferring a substrate processed by the process block through the sixth stage to the second transfer device.

According to a second aspect of the present invention, there is provided an operation method of a coating/developing apparatus that comprises a carrier block configured to place therein a carrier that stores a plurality of substrates, and including a first transfer device configured to transfer substrates to and from the carrier, a process block including a plurality of processing modules configured to perform resist coating on substrates transferred from the first transfer device and to perform development on substrates processed by the resist coating and light exposure, and a device configured to transfer substrates to and from the processing modules, an examination block including a plurality of examination modules configured to perform examinations on substrates, and a second transfer device configured to transfer substrates to and from the examination modules, and a first stage, a second stage, a third stage, and a fourth stage configured to allow substrates to be transferred between the first transfer device in the carrier block and the second transfer device in the examination block, the operation method comprising executing a first operation mode preset to transfer substrates from the process block and substrates from the carrier block into the examination block in parallel, wherein the first operation mode comprises: transferring substrates processed by the process block to either one of the third and fourth stages through or not through at least one of the examination modules by the second transfer device; transferring substrates to be only examined from a carrier in the carrier block to the second stage by the first transfer device, and transferring these substrates from the second stage to at least one of the examination modules by the second transfer device; and transferring substrates thus examined from the examination block to either one of the third and fourth stages by the second transfer device.

The first operation mode may comprise selecting empty one of the third and fourth stages to transfer a substrate thereto by the second transfer device. The operation method may further comprise executing a second operation mode preset to transfer substrates only from the process block into the examination block, and selecting one of the first and second operation modes, and the second operation mode may comprise transferring substrates processed by the process block to any one of the second, third, and fourth stages through or not through at least one of the examination modules by the second transfer device. The second operation mode may comprise selecting empty one of the second, third, and fourth stages to transfer a substrate thereto by the second transfer device. A fifth stage and a sixth stage may be disposed between the process block and the examination block, and the operation method may further comprise transferring a substrate from the first stage to the fifth stage by the second transfer device, and transferring a substrate processed by the process block through the sixth stage to the second transfer device.

According to a third aspect of the present invention, there is provided a computer readable storage medium that stores a program for execution on a computer, wherein the program, when executed, causes the computer to conduct the operation method of the coating/developing apparatus according to the second aspect.

In the first to third aspects, the first operation mode may comprise transferring substrates to be processed by the process block from a carrier in the carrier block to the first stage by the first transfer device, and transferring these substrates from the first stage to the process block by the second transfer device.

The controller or operation method may further include a part or step to identify a first carrier that stores substrates to be processed by the process block and a second carrier that stores substrates to be only examined, and a part or step to select an operation mode in accordance with a result of identification of the first and second carriers. In this case, it may be arranged to switch the second operation mode to the first operation mode in response to placement of the second carrier in the carrier block while substrates from the first carrier are treated.

The controller or operation method may further include a function of executing a third operation mode preset to transfer substrates only from the carrier block into the examination block, and a part or step to select one of the first, second, and third operation modes, and the third operation mode may comprise transferring substrates to be only examined from a carrier in the carrier block to the second stage by the first transfer device, and transferring these substrates from the second stage to at least one of the examination modules by the second transfer device, and transferring substrates thus examined from the examination block to either one of the third and fourth stages by the second transfer device.

The controller or operation method may further include a part or step to identify a first carrier that stores substrates to be processed by the process block and a second carrier that stores substrates to be only examined, and a part or step to select an operation mode in accordance with a result of identification of the first and second carriers. In this case, it may be arranged to switch the second or third operation mode to the first operation mode in response to placement of one of the first and second carriers in the carrier block while substrates from the other of the first and second carriers are treated, and, thereafter to switch the first operation mode to the second or third operation mode in response to a state where a process on substrates from one of the first and second carriers is finished before a process on substrates from the other of the first and second carriers is finished.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
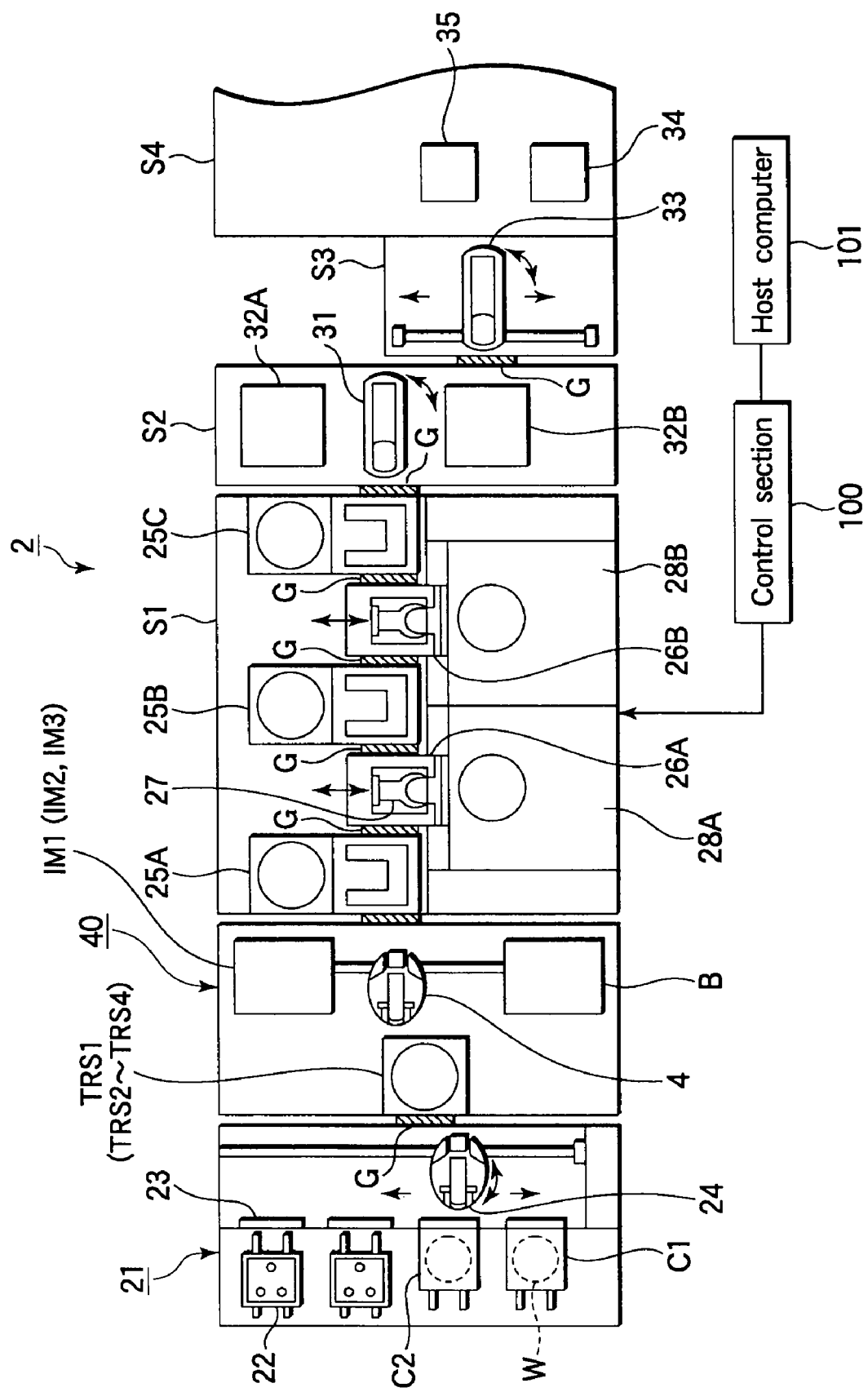
FIG. 1 is a plan view showing a coating/developing apparatus according to an embodiment of the present invention.
Figure 2:
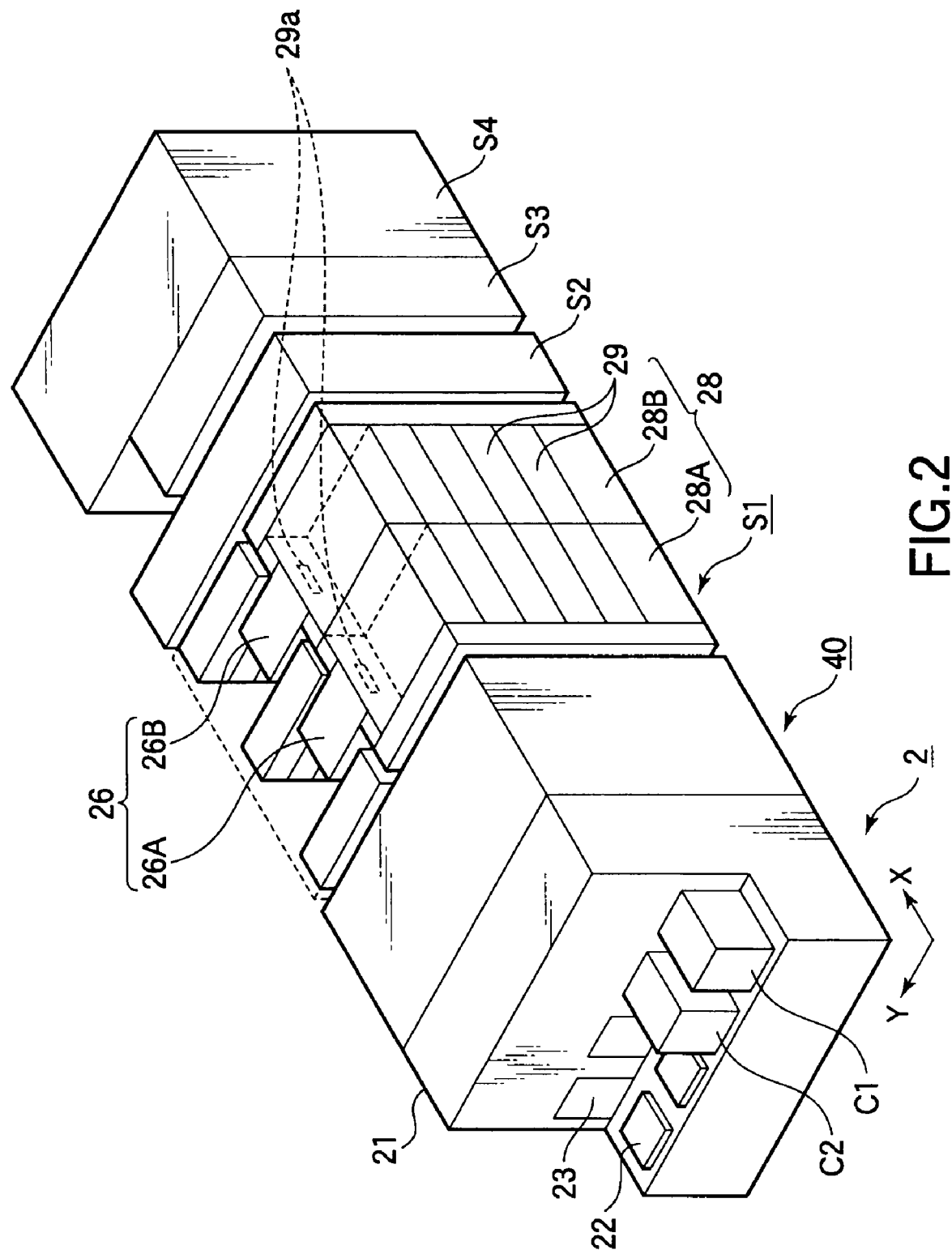
FIG. 2 is a perspective view showing an external appearance of the coating/developing apparatus.

At first, an explanation will be given of a coating/developing apparatus 2 according to an embodiment of the present invention, with reference to the plan view shown in FIG. 1 and the perspective view shown in FIG. 2. According to this coating/developing apparatus 2, a carrier C1 that stores wafers W or substrates to be processed by coating and development and a carrier C2 that stores wafers W or substrates to be only examined without being processed by coating and development are transferred by a transfer mechanism (not shown) between the coating/developing apparatus 2 and the outside. As shown in FIGS. 1 and 2, a carrier block 21 is disposed to place thereon a plurality of carriers C1 and C2 as defined above. For example, the carriers C1 and C2 respectively store different lots of wafers W in an airtight state and each of the lot is formed of, e.g., 25 wafers W.

The carrier block 21 includes a table area 22 for placing the carriers C1 and C2 thereon and door ports 23 formed in a partition wall in front of the table area 22. The carrier block 21 further includes a transfer device or transfer arm 24 for transferring wafers W to and from the carriers C1 and C2 through the door ports 23. The transfer arm 24 is movable up and down, right and left, and back and forth, and is further rotatable about a vertical axis. The transfer arm 24 is controlled in accordance with instructions transmitted from a control section 100 described later.

Figure 3:
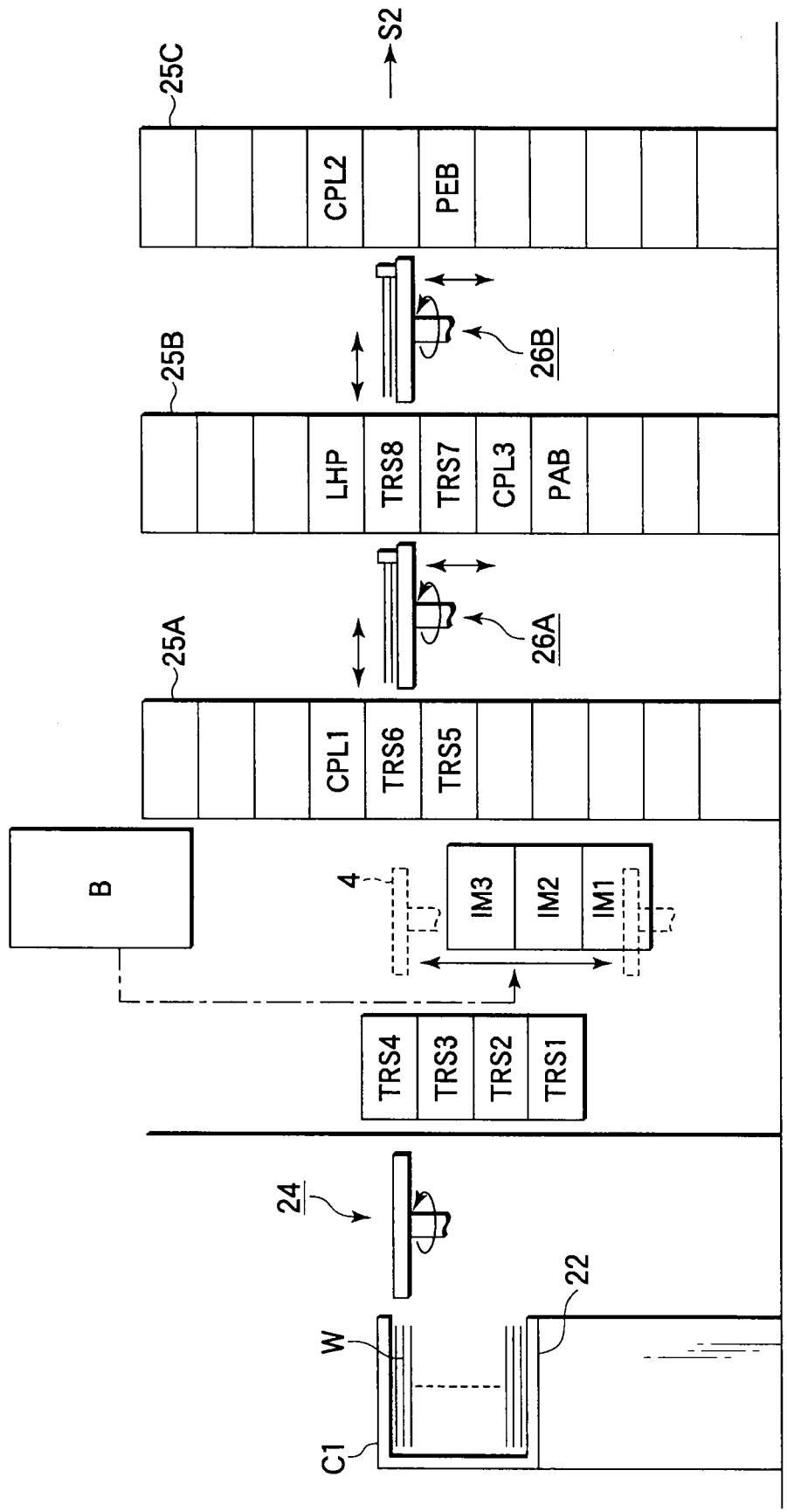
FIG. 3 is a sectional side view showing the coating/developing apparatus.

An examination block 40 and a process block S1 surrounded by respective housings are connected to the carrier block 21 and arrayed in this order in the forward direction. The examination block 40 includes four transfer stages TRS1 to TRS4, examination modules IM1 to IM3, and a buffer module B for temporarily placing wafers W transferred from the process block S1 into the examination block 40. The examination block 40 further includes a substrate transfer device or transfer arm 4 for transferring wafers among the stages TRS1 to TRS4, examination modules IM1 to IM3, and buffer module B, as well as the transfer stages TRS5 and TRS6 of the process block S1. As shown in FIG. 3, the first to fourth stages or transfer stages TRS1 to TRS4 are stacked one on top of the other, and the examination modules IM1 to IM3 are also stacked one on top of the other. The transfer stages TRS1, TRS2, TRS3, and TRS4 may be referred to as first, second, third, and fourth stages, respectively. The examination block 40 will be described later in more detail, and the process block S1 will be first explained below.

The process block S1 includes three rack module columns 25 (25A, 25B, and 25C) and two main transfer devices or main arms 26A and 26B alternately arrayed in the forward direction. Each of the rack module columns 25 includes heating/cooling modules stacked one on top of the other. The main arms 26A and 26B are used for transferring wafers W among liquid processing module columns described later. Each of the main arms 26 (26A and 26B) includes two arms, which are movable up and down, right and left, and back and forth, and are further rotatable about a vertical axis. The main arms 26 are controlled in accordance with instructions transmitted from the control section 100 described later.

The rack module columns 25 (25A, 25B, and 25C) and main arms 26A and 26B are arrayed in a row from the carrier block 21 side, and opening portions (not shown) are formed at respective connecting portions G therebetween for transferring wafers. Consequently, wafers W can be freely moved between the rack module column 25A on one side and the rack module column 25C on the other side in this process block S1. Each of the main arms 26A and 26B is located inside a space surrounded by partition walls for the rack module columns 25 (25A, 25B, and 25C) on the opposite sides in the forward direction from the carrier block 21 side, a partition wall for liquid processing units on the right side, and a rear partition wall on the left side, for example.

At positions where wafers W are transferred by the main arms 26 (26A and 26B), liquid processing module columns 28 (28A and 28B) are disposed. Each of the liquid processing module columns 28 is formed of coating modules (COT) for resist coating and developing units (DEV) stacked one on top of the other. For example, as shown in FIG. 2, each of the liquid processing module columns 28 (28A and 28B) includes a plurality of, such as five, process containers 29 stacked one on top of the other for respectively storing liquid processing units.

For example, as shown in FIG. 3, each of the rack module columns 25 (25A, 25B, and 25C) includes, e.g., ten modules stacked one on top of the other. These modules include transfer stages (TRS5 to TRS8) for transferring wafers W, a heating unit or heating module (LHP) for performing a heating process on wafers after development liquid coating, and cooling units or cooling modules (CPL1, CPL2, and CPL3) for performing a cooling process on wafers before and after resist liquid coating and before development. These modules further include a heating unit or heating module (PAB) for performing a heating process on wafers after resist coating and before light exposure, and a heating unit or heating module (PEB) for performing a heating process on wafers after light exposure. The TRS5 and TRS6 are used for transferring wafers between the carrier block 21 and process block S1, and the TRS7 and TRS8 are used for transferring wafers between the two main arms 26A and 26B. In this embodiment, the heating module (LHP), heating module (PAB), heating module (PEB), and cooling modules (CPL1, CPL2, and CPL3) are processing modules. The transfer stages TRS5 and TRS6 are fifth and sixth stages, respectively.

The process block S1 is connected to a light exposure apparatus S4 at a position in the forward direction from the rack module column 25C through a first interface block S2 and a second interface block S3. The first interface block S2 includes a transfer arm 31 movable up and down and rotatable about a vertical axis for transferring wafers to and from the CPL2 and PEB of the rack module column 25C in the process block S1, as described later. The first interface block S2 further includes a rack module column 32A formed of a periphery light exposure unit, an incoming buffer cassette for temporarily placing wafers to be transferred to the light exposure apparatus S4, and an outgoing buffer cassette for temporarily placing wafers transferred from the light exposure apparatus S4, which are stacked one on top of the other. The first interface block S2 further includes a rack module column 32B formed of wafer transfer stages and high-precision temperature adjusting modules stacked one on top of the other.

The second interface block S3 includes a transfer arm 33 for transferring wafers to and from the transfer stages and high-precision temperature adjusting modules in the first interface block S2, as well as the incoming stage 34 and outgoing stage 35 of the light exposure apparatus S4.

Figure 4:
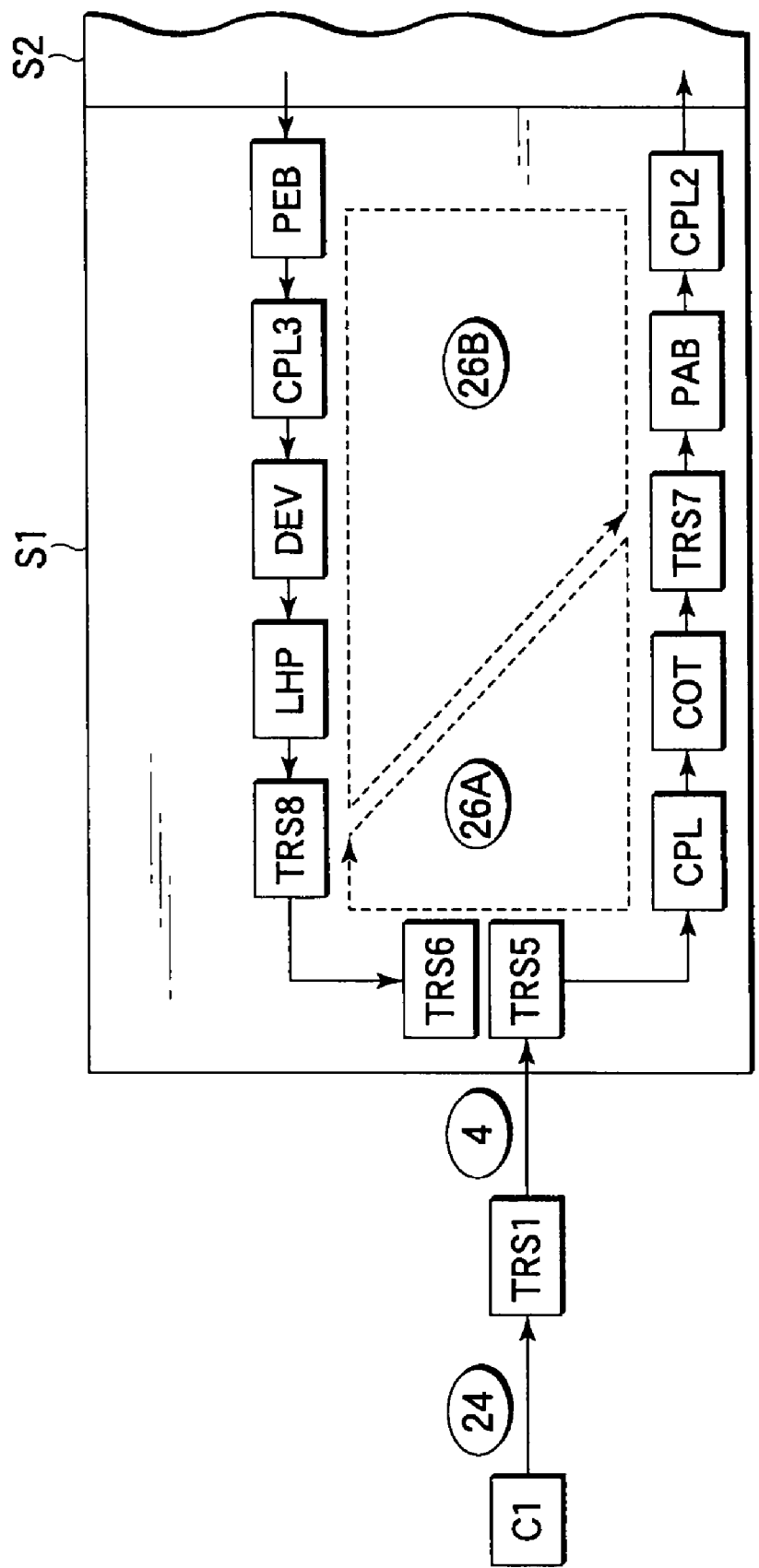
FIG. 4 is a view showing transfer routes in the process block of the coating/developing apparatus.

Next, an explanation will be given of an operation of the main arms 26A and 26B in the process block S1, with reference to FIG. 4. In FIG. 4, the respective routes of the main arms 26A and 26B are indicated by broken lines. Specifically, for example, the main arm 26A performs a cycle transfer of wafers through a circulation route of "TRS5→CPL1→COT→TRS7→TRS8→TRS6", while the main arm 26B performs a cycle transfer of wafers through a circulation route of "TRS7→PAB→CPL2→PEB→CPL3→DEV→LHP→TRS8". Accordingly, as shown in an example of the layout of the rack module columns 25A to 25C in FIG. 3, they are designed such that the TRS5 and TRS6 are in the rack module column 25A, TRS7 and TRS8 are in the rack module column 25B, CPL2 and PEB are in the rack module column 25C, CPL1 is in the rack module column 25A or rack module column 25B, and the LHP is in the rack module column 25B or rack module column 25C.

Each of the main arms 26A and 26B unloads a wafer W placed in a processing module that requires transfer and then loads a subsequent wafer W supported thereon into this processing module. In this way, the main arms 26A and 26B transfer wafers W placed in the respective modules to subsequent modules one by one in accordance with a prescribed transfer schedule (the order of modules in transferring wafers W).

Next, an explanation will be given of a flow of wafers where coating and developing processes are performed on substrates in the process block S1. At first, when a carrier C1 that stores wafers W to be processed by coating and development is transferred into the carrier block 21 from outside, the corresponding one of the door ports 23 is opened while the lid of the carrier C1 is detached, and then the wafers W are taken out by the transfer arm 24. Then, each of the wafer W is transferred by the transfer arm 24 into the transfer stage TRS1, and is then transferred by the transfer arm 4 in the examination block 40 to the transfer stage TRS5. Then, the wafer W is received by the main arm 26A from the transfer stage TRS5, and is transferred by the main arms 26A and 26B through a route of "TRS5→CPL1→COT→TRS7→PAB→CPL2", as described above. Then, the wafer W with a resist liquid applied thereon is transferred from the CPL2 into the first interface block S2.

In the first interface block S2, the wafer W is transferred by the transfer arm 31 through a route of "incoming buffer cassette→periphery light exposure Unit→high-precision temperature adjusting module", and is then transferred through the transfer stage of the rack module column 32B into the second interface block S3. Thereafter, the wafer W is transferred by the transfer device 33 through the incoming stage 34 of the light exposure apparatus S4 into the light exposure apparatus S4, and then undergoes light exposure.

After the light exposure, the wafer W is transferred through a route of "outgoing stage 35 →second interface block S3→outgoing buffer cassette of first interface block S2", and is then transferred by the transfer arm 31 into the PEB in the process block S1. Thereafter, the wafer W is transferred through a route of "CPL3→DEV→LHP→TRS8→TRS6", as described above, so that a predetermined developing process is performed by the developing unit to form a predetermined resist pattern.

Figure 5:
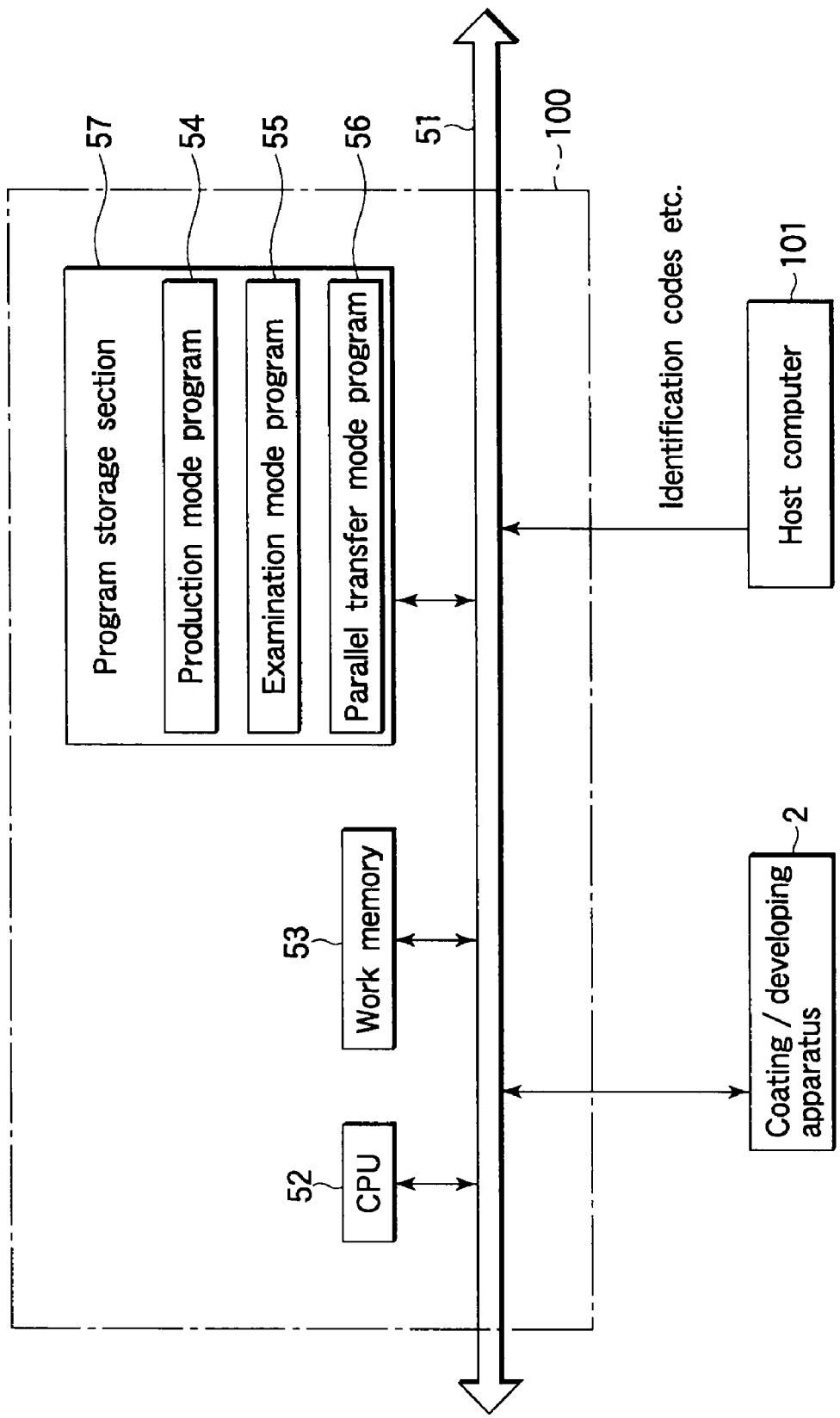
FIG. 5 is a view showing the structure of a control section used for the coating/developing apparatus.

The coating/developing apparatus 2 includes the control section 100 comprising, e.g., a computer, the structure of which is shown in FIG. 5. As shown in FIG. 5, a bus 51 is connected to a CPU52 and a work memory 53 for performing various arithmetical operations. The bus 51 is further connected to a program storage section 57 that stores a production mode program 54, an examination mode program 55, and a parallel transfer mode program 56, which respectively execute different transfer operations, as described later. In the program storage section 57, the programs 54, 55, and 56 are stored in a storage medium, such as a hard disk, compact disk, magneto-optical disk, or memory card. The parallel transfer mode and production mode respectively correspond to the first operation mode and second operation mode set out in the claims.

The control section 100 is connected to a host computer 101. For example, the host computer 101 sets identification codes including process recipe data on respective carriers to be transferred to the coating/developing apparatus, indicative of whether each carrier stores a lot of wafers to be processed by coating and development or a lot wafers to be only examined, i.e., the wafers are to be processed as wafers in the carrier C1 or as wafers in the carrier C2. The host computer 101 further administrates the timings for the respective carriers C1 and C2 to be transferred to the coating/developing apparatus 2. Before the carriers C1 and C2 are transferred to the coating/developing apparatus, the host computer 101 transmits signals corresponding to their identification codes to the control section 100. Base on the signals, the control section 100 reads out one of the programs 54, 55, and 56, as described later, so as to control a series of processes along with the transfer operations of the transfer arm 24 and transfer arm 4 in accordance with the read-out program.

Further, for example, the control section 100 is provided with an input display (not shown), from which an operator for the coating/developing apparatus 2 can preset selection of examination modules IM to be used for executing each of the production mode and examination mode. Specifically, for example, the production mode can be preset to use no examination modules for examination or to use one or more examination modules IM, while the examination mode can be preset to use one or more examination modules IM. In this embodiment, the production mode and examination mode are preset to use different examination modules IM. On the other hand, since the parallel transfer mode uses the same examination modules as the production mode and examination mode, selection of the examination modules for the production mode and examination mode automatically determines the examination modules to be used for the parallel transfer mode.

The control section 100 presets the 25 wafers stored in each of the carriers C1 and C2 to have a particular order form them to be transferred to the carrier block S1. Before the carriers C1 and C2 are transferred to the coating/developing apparatus, an operator can preset from the input display, for each of the first wafer No. 1 to the last wafer No. 25 in the lot, as to whether to use one or more examinations performed by the examination modules IM1 to IM3 or to use no examination.

Next, an explanation will be given of the transfer modes respectively executed in accordance with the programs 54 to 56. The production mode executed by the program 54 is used when no wafers W are taken out from the carrier C2 that stores wafers W to be only examined, i.e., a serial flow is not executed for the wafers W from the carrier C2. At this time, each of the wafers W from the carrier C1 placed in the carrier block 21 is transferred within the process block S1 and first and second interface blocks S2 and S3 through the route described above, so as to form a resist pattern on the wafer W. Further, since it has been preset to examine only part of the wafers W in each lot (carrier), the wafers with the resist pattern formed thereon are transferred in different ways for the respective wafers. Specifically, the wafers to be examined are transferred to one or more examination modules IM for examination and are then returned to the carrier C1, and the wafers not to be examined are directly returned to the carrier C1.

The examination mode is used when no wafers W are taken out from the carrier C1, and executes an examination flow. In the examination flow, each of the wafers W from the carrier C2 placed in the carrier block 21 is transferred not to the process block S2 but to one or more examination modules IM for predetermined examination, and is then returned to the carrier C2. The parallel transfer mode executes a parallel transfer for transferring wafers W taken out from the carrier C1 and wafers W taken out from the carrier C2 in parallel, as described later.

As described above, the host computer 101 outputs signals corresponding to the identification codes of the carriers including the process recipes for the lots, and the control section 100 stores the identification codes. Then, when the carrier C1 or carrier C2 is transferred to the carrier block 21, the control section 100 reads out the identification code corresponding to the carrier from the stored data, and determines a program to be executed with reference to the read-out identification code and the process being executed in the coating/developing apparatus 2.

Specifically, when the carrier C1 is transferred to the carrier block 21, the production mode program 54 is read out and executed. When the carrier C2 is transferred to the carrier block 21, the examination mode program 55 is read out and executed.

When the carrier C2 is transferred to the carrier block 21 while wafers W from the carrier C1 are processed, the parallel transfer mode program 56 is read out and executed in place of the production mode program 54 having been executed, and, for example, the parallel transfer is started from a cycle subsequent to the transfer cycle currently used (one cycle is defined by a cycle for the main arms 26A and 26B to circulate the circulation passage). Similarly, when the carrier C1 is transferred to the carrier block 21 while wafers W from the carrier C2 is processed, the parallel transfer mode program 56 is read out and executed in place of the examination mode program 55 having been executed, and, for example, the parallel transfer is started from a cycle subsequent to the transfer cycle currently used.

There is a case where, while the parallel transfer is executed, the process on the wafers W from the carrier C2 is finished before the process on the wafers W from the carrier C1 is finished. In this case, when the last wafer W is returned to the carrier C2, a signal is output from, e.g., the transfer arm 24 to the control section 100, so that the parallel transfer mode program 56 is terminated by the control section 100 and the production mode program 54 is alternatively read out and executed. Similarly, there is a case where, while the parallel transfer is executed, the process on the wafers W from the carrier C1 is finished before the process on the wafers W from the carrier C2 is finished. In this case, when the last wafer W is returned to the carrier C1, a signal is output from, e.g., the transfer arm 24 to the control section 100, so that the parallel transfer mode program 56 is terminated by the control section 100, and the examination mode program 55 is alternatively read out and executed.

Figure 6:
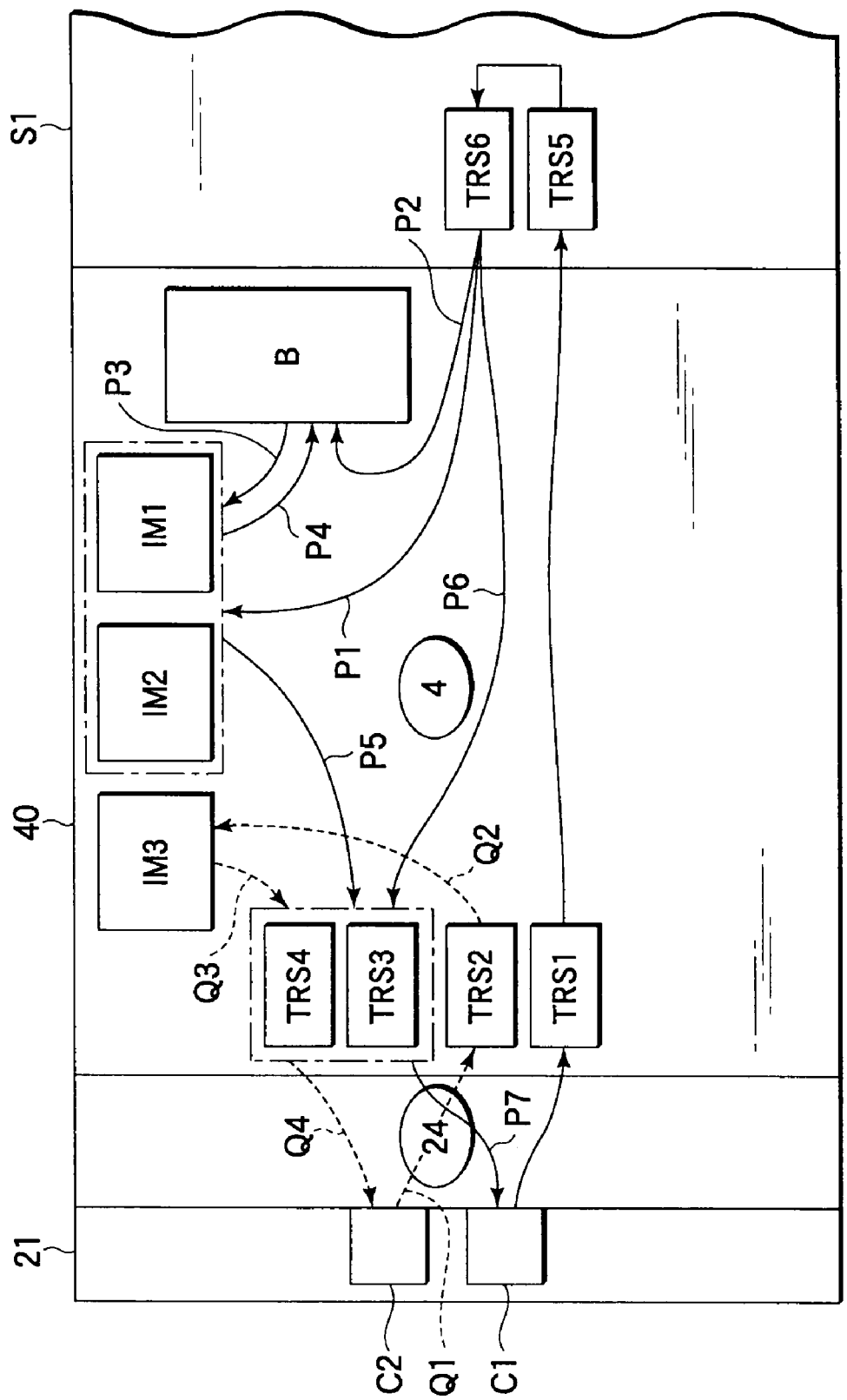
FIG. 6 is a view showing transfer routes used for executing a parallel transfer mode in the coating/developing apparatus.
Figure 7:
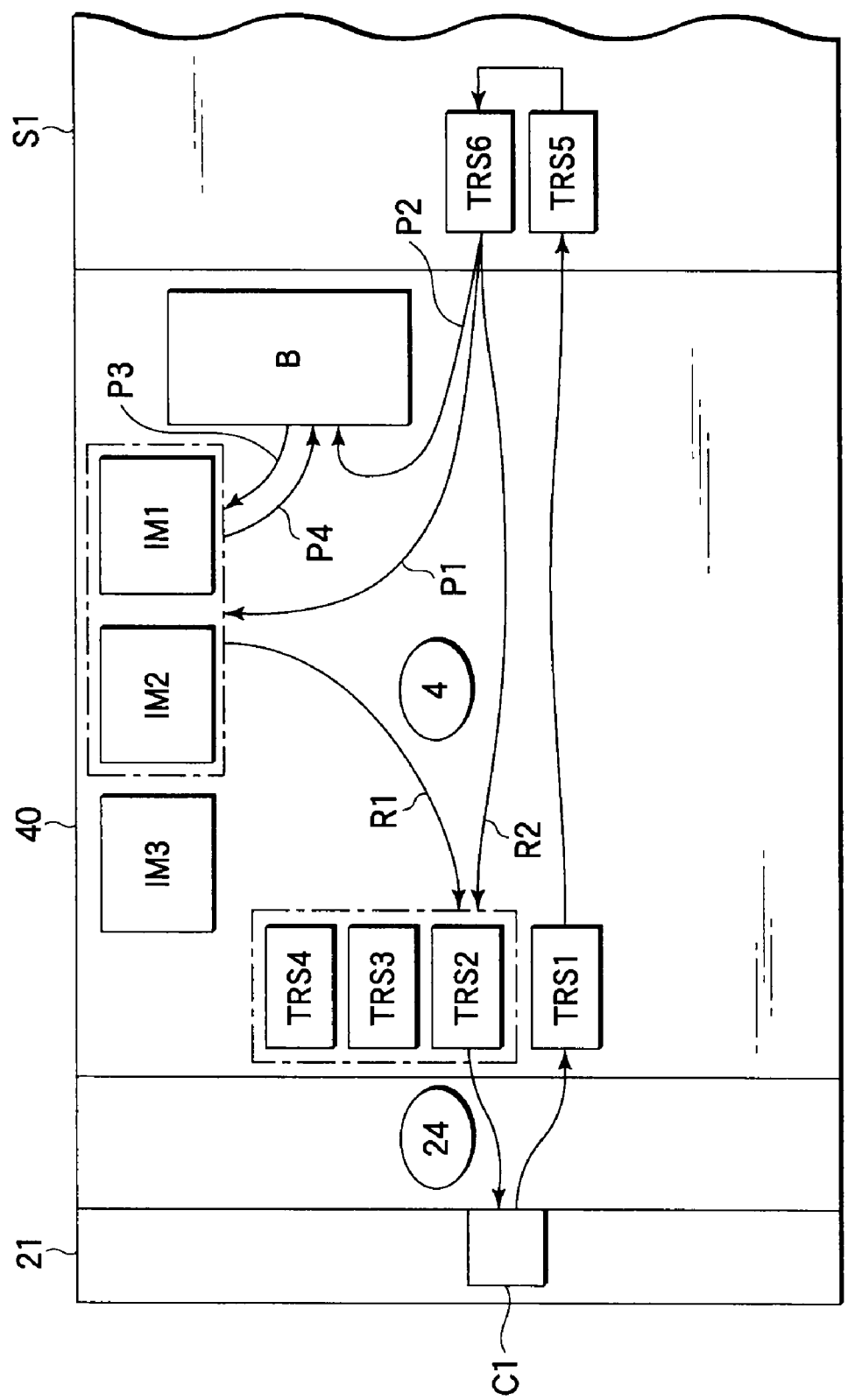
FIG. 7 is a view showing transfer routes used for executing a production mode in the coating/developing apparatus.
Figure 8:
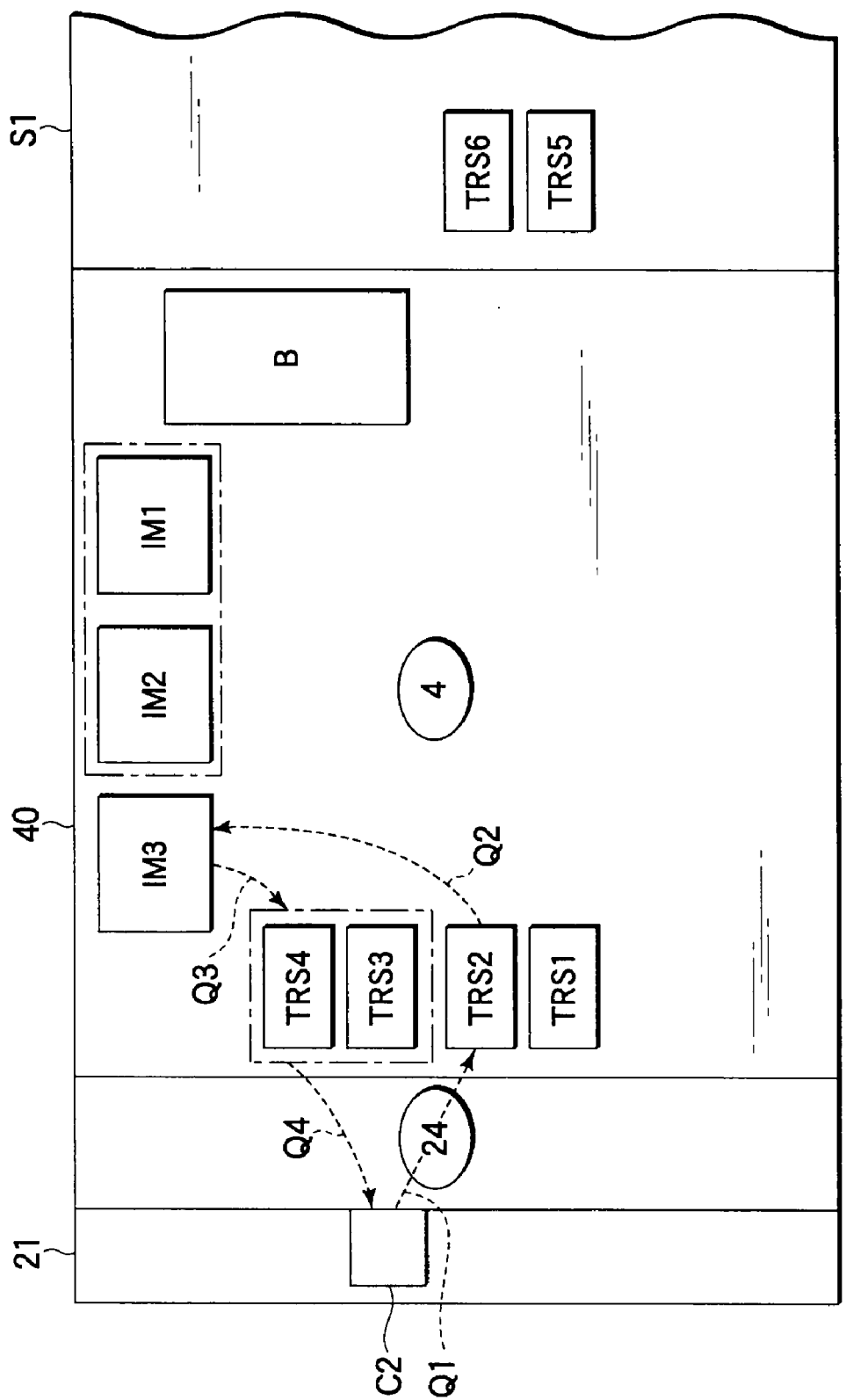
FIG. 8 is a view showing transfer routes used for executing an examination mode in the coating/developing apparatus.

Next, a detailed explanation will be given of the examination block 40 with reference also to FIGS. 6 to 8. In FIGS. 6 to 8, the respective modules are shown as being arrayed side by side in the examination block for the sake of convenience, but they are actually stacked one on top of the other, and the positional relationship between the respective modules is actually different. The transfer stage TRS1 is used for placing each wafer W taken out from the carriers C1 and C2 and transferred to the process block S1. The transfer stages TRS2 to TRS4 are used for placing wafers W transferred from the transfer stage TRS6 through one or more examination modules IM, and for placing wafers W transferred from the transfer stage TRS6 not through any of the examination modules IM, in executing the production mode.

In executing the parallel transfer mode and examination mode, the transfer stage TRS2 is used for placing each wafer W from the carrier C2 transferred by the transfer arm 24. In executing the examination mode, the transfer stages TRS3 and TRS4 are used for placing wafers W examined by one or more examination modules IM. In executing the parallel transfer mode, the transfer stages TRS3 and TRS4 are used for placing wafers W from the carrier C1, which have been transferred to the TRS6 and then transferred through one or more examination modules IM or not through any of the examination modules IM, and for placing wafers W from the carrier C2, which have been examined by one or more examination modules IM.

In this embodiment, the examination module IM1 is a macro examination module for detecting macro defects on wafers W. The examination module IM2 is a film thickness/line width examination module fro measuring the thickness of a film and the line width of a pattern formed on wafers W. The examination module IM3 is a superimposition examination module for detecting misalignment of light exposure superimposition, i.e., the positional misalignment between a pattern currently formed and an underlying pattern therebelow. In this case, the examination modules IM1, IM2, and IM3 use examination time periods of, e.g., 30 seconds, 100 seconds, and 140 seconds, respectively. Since the examination time periods of the examination modules IM1, IM2, and IM3 are different, an examination of a succeeding wafer W (with a higher substrate number) started later may be finished before an examination of a preceding wafer W (with a lower substrate number) is finished.

The transfer stages TRS, the processing units, such as heating units, and the examination modules IM1 to IM3 can be called modules in general. According to this generic terminology, when a wafer W is loaded and unloaded to and from a transfer target module, an out-ready signal and an in-ready signal for the module are respectively output. In other words, when an in-ready signal for a certain module is output, it indicates that a wafer W can be loaded in this certain module from an upstream module. When an out-ready signal for a certain module is output, it indicates that a wafer W can be unloaded from this certain module. With reference to these ready signals, the control section 100 can judge how wafers can be transferred from modules to modules for, e.g., each cycle time, so that transfer operations are determined on the basis of this judgment and rules described later.

Next, an explanation will be given of rules for transferring wafers W by the transfer arm 4 in the examination block 40. In the respective modes described above, wafers W are unloaded by the transfer arm 4 from the examination module IM1 (IM2, IM3) in the order in which the examination is finished, without reference to the substrate numbers assigned to the wafers W in each lot. For example, there may be a case where wafers W are respectively transferred to different examination modules IM, and the process on the wafer W with No. 11 is finished and the process on the wafer W with No. 9 is not finished in a cycle time. In this case, the wafer W with No. 11 is unloaded from the examination module IM in which the examination has been finished, before the wafer W with No. 9 is unloaded.

In the production mode, when wafers W are transferred into the stages TRS2 to TRS4 in a cycle time, a wafer is transferred by the transfer arm 4 to one of the stages for which an in-ready signal has been output. In the examination mode and parallel transfer mode, when wafers W are transferred into the stages TRS3 and TRS4 in a cycle time, a wafer is transferred by the transfer arm 4 to one of the stages for which an in-ready signal has been output.

In the case where wafers W from the carrier C1 or carrier C2 have been preset to be examined by a plurality of examination modules IM, when the wafers W are transferred to the examination modules IM, a wafer is transferred by the transfer arm 4 to one of the examination modules IM for which an in-ready signal has been output.

Next, an explanation will be given of transfer routes of wafers W in the examination block 40, used in the respective modes. In the following explanation, it is assumed that the following conditions are used. Specifically, the production mode is preset to use the examination modules IM1 and IM2 and to examine part of the wafers W from the carrier C1 by the examination module IM1 or IM2 or modules IM1 and IM2. The examination mode is preset to use the examination module IM3 and to examine part of the wafers W from the carrier C2 by the examination module IM3.

<Execution of Parallel Transfer Mode>

With reference to FIG. 6, an explanation will be given of transfer routes of wafers W from the carrier C1 and carrier C2 used for executing the parallel transfer mode. In the examination block 40 and carrier block 21 shown in FIG. 6, solid line arrows denote transfer routes of wafers W to be processed by coating and development from the carrier C1, and broken line arrows denote transfer routes of wafers W to be only examined from the carrier C2.

At first, transfer routes of wafers W from the carrier C1 after the coating and developing processes are finished will be explained. As described above, when a wafer W is placed in the transfer stage TRS6, a judgment is made by the control section 100 of whether or not this wafer W has been preset to be examined by the examination module IM1 or examination module IM2. If this wafer W is judged as having been preset to be examined, a judgment is made of whether or not the examination module IM for the designated examination is empty. If the examination module IM is judged as being empty, the wafer W is transferred by the transfer arm 4 into the examination module IM, as shown by an arrow P1. Where the wafer W has been preset to be examined by both of the examination modules IM1 and IM2, and both of the examination modules IM are empty, the wafer W is first transferred to the IM1, for example.

For the wafer W placed on the transfer stage TRS6, if the examination module IM for the designated examination is judged by the control section 100 as being not empty, the wafer W is transferred by the transfer arm 4 into the buffer module B, as shown by an arrow P2. For the wafer W transferred into the buffer module B, a judgment is made by the control section 100 in subsequent respective cycles of whether or not the examination module IM1 or IM2 for the designated examination is empty. If the examination module IM is judged as being empty, the wafer W is transferred by the transfer arm 4 into the examination module IM, as shown by an arrow P3.

For the wafer W transferred into the examination module IM1, a judgment is made by the control section 100, after the examination is finished, of whether or not the wafer has been preset to be examined by the examination module IM2. If judged so, a judgment is made by the control section 100 of whether or not the examination module IM2 is empty. If the examination module IM2 is judged as being empty, the wafer W is transferred by the transfer arm 4 into the examination module IM2. If the examination module IM2 is judged as being not empty, the wafer W is transferred into the buffer module B, as shown by an arrow P4. Similarly, for the wafer W transferred into the examination module IM2, a judgment is made by the control section 100, after the examination is finished, of whether or not the wafer has been preset to be examined by the examination module IM1. If judged so, a judgment is made of whether or not the examination module IM1 is empty. If the examination module IM1 is judged as being empty, the wafer W is transferred into the examination module IM1. If the examination module IM1 is judged as being not empty, the wafer W is transferred into the buffer module B.

For the wafer W transferred into the examination module IM1 or IM2, when all the designated examinations are judged by the control section 100 as having been finished, a judgment is made of whether or not either one of the transfer stages TRS3 and TRS4 is empty. If one of the transfer stages TRS3 and TRS4 is judged as being empty, the wafer W is transferred into this empty stage, as shown by an arrow P5.

For the wafer W placed on the transfer stage TRS6, if the wafer W is judged by the control section 100 as having been preset not to be examined by either of the examination modules IM1 and IM2, a judgment is made by the control section 100 of whether or not either one of the transfer stages TRS3 and TRS4 is empty. If one of the transfer stages TRS3 and TRS4 is judged as being empty, the wafer W is transferred into this empty stage, as shown by an arrow P6. The wafer W thus transferred into the transfer stage TRS3 or TRS4 is then returned by the transfer arm 24 into the carrier C1 (arrow P7).

Next, transfer routes of wafers W from the carrier C2 will be explained. For the respective wafers W in the carrier C2, a judgment is made by the control section 100, in the order from the lowest substrate number, of whether or not the wafer W has been preset to be examined by the examination module IM3. If the wafer W is judged as having been preset not to be examined, the wafer W is left as it is in the carrier C2. If the wafer W is judged as having been preset to be examined, a judgment is made by the control section 100 of whether or not the transfer stage TRS2 is empty. If the transfer stage TRS2 is judged by the control section 100 as being not empty, the wafer W is left in the carrier C2. If the transfer stage TRS2 is judged as being empty, the wafer W is transferred by the transfer arm 4 into the transfer stage TRS2, as shown by an arrow Q1. Then, a judgment is made of whether or not the examination module IM3 is empty.

If the examination module IM3 is judged by the control section 100 as being empty, the wafer W is transferred by the transfer arm 4 from the transfer stage TRS2 into the examination module IM3, as shown by an arrow Q2. If the examination module IM3 is judged as being not empty, the wafer W is left in the transfer stage TRS2.

When the examination of the examination module IM3 is finished, a judgment is made by control section 100 of whether or not either one of the transfer stages TRS3 and TRS4 is empty. If one of the transfer stages TRS3 and TRS4 is judged as being empty, the wafer W is transferred into this empty stage, as shown by an arrow Q3. The wafer W thus transferred into the transfer stage TRS3 or TRS4 is then returned by the transfer arm 24 into the carrier C2.

<Execution of Production Mode>

Next, with reference to FIG. 7, an explanation will be given of transfer routes of wafers W used for executing the production mode. Since the transfer routes of wafers W from the carrier C1 in this mode are almost the same as the transfer routes of wafers W from the carrier C1 in the parallel transfer mode, the following explanation will be focused on differences from the parallel transfer mode. For a wafer W placed on the transfer stage TRS6, a judgment is made by the control section 100 of whether or not the wafer W has been preset to be examined. If the wafer W is judged as having been preset to be examined, and the designated examination module IM is empty, the wafer W is transferred into the examination module IM (arrow P1). If the designated examination module IM is not empty, the wafer W is transferred into the buffer module B (arrow P2). After the examination of the examination module IM1 or IM2 is finished, if the subsequent examination module is not empty, the wafer W is transferred into the buffer module B (arrow P3). The wafer W thus transferred to the buffer module B is transferred afterward into the designated examination module IM1 or IM2 when the examination module becomes empty (arrow P4).

When all the designated examinations are finished for the wafer W transferred into the examination module IM1 or IM2, the wafer W is transferred from the examination module used for the last examination to empty one of the transfer stages TRS2 to TRS4 (arrow R1). If the wafer W placed on the transfer stage TRS6 is judged as having been preset not to be examined by either of the examination modules IM1 and IM2, the wafer W is transferred to empty one of the transfer stages TRS2 to TRS4 (arrow R2). The wafer W thus transferred into each of the transfer stages TRS2 to TRS4 is then returned by the transfer arm 24 into the carrier C1.

<Execution of Examination Mode>

Next, with reference to FIG. 8, an explanation will be given of transfer routes of wafers W used for executing the examination mode. In the examination mode, as in the parallel transfer mode, a judgment is made by the control section 100, in the order from the lowest substrate number, of whether or not the wafer W has been preset to be examined by the examination module IM3. If the wafer W is judged as having been preset to be examined, the wafer W is transferred through a route of "carrier C2→transfer stage TRS2→examination module IM3→transfer stage TRS3 or TRS4→carrier C2", as shown by broken line arrows Q1 to Q4.

As described above, according to the coating/developing apparatus 2, when the parallel transfer mode is executed, wafers W from the carrier C1 are processed by coating and development. Then, the wafers W from the carrier C1 are transferred through the transfer stage TRS6 and are partly examined by one or more predetermined examination modules IM and partly not examined by any of the examination modules IM. On the other hand, wafers W from the carrier C2 are transferred through the transfer stage TRS2 and are examined by one or more predetermined examination modules IM.

The wafers W from the carrier C1 thus treated and the wafers W from the carrier C2 thus treated are returned through the transfer stage TRS3 or TRS4 into the respective carriers C1 and C2. In this case, for the wafers W transferred into the examination block 40 and then returned into the carrier C1 and C2, there are a plurality of transfer paths. Hence, even if the examinations of the examination modules IM are finished at the same time, transfer of wafers W to and from the transfer stages TRS3 and TRS4 can be flexibly adjusted, so that the wafer W are prevented from being stuck in the examination modules IM1 to IM3 due to the transfer stages TRS3 and TRS4 being occupied, and the throughput is thereby prevented from being lowered.

In the embodiment described above, when wafers W to be examined are not treated, the production mode is executed such that the transfer stages TRS2 to TRS4 are used as three transfer paths from the respective examination modules IM. Consequently, the wafers W are effectively prevented from being stuck in the examination modules IM due to the transfer paths being occupied, and the throughput is thereby improved.

When the parallel transfer mode is executed, empty one of the transfer stages TRS3 and TRS4 is selected to transfer each wafer W, and so wafers can be transferred into the TRS3 and TRS4 more efficiently as compared to a case where the order of the TRS3 and TRS4 used for transfer is predetermined, for example. Consequently, the wafer W are prevented from being stuck in the respective examination modules IM and buffer module B, and the throughput is thereby prevented from being lowered. When the production mode is executed, empty one of the transfer stages TRS2 to TRS4 is selected to transfer each wafer W, and so wafers can be transferred into the TRS2 to TRS4 efficiently, as in the parallel transfer mode, and the throughput is thereby prevented from being lowered.

The coating/developing apparatus 2 described above may be modified such that the transfer modes can be switched by an operator for the apparatus, by manually operating the input display of the control section 100 to switch the respective programs to be read out.

Figure 9:
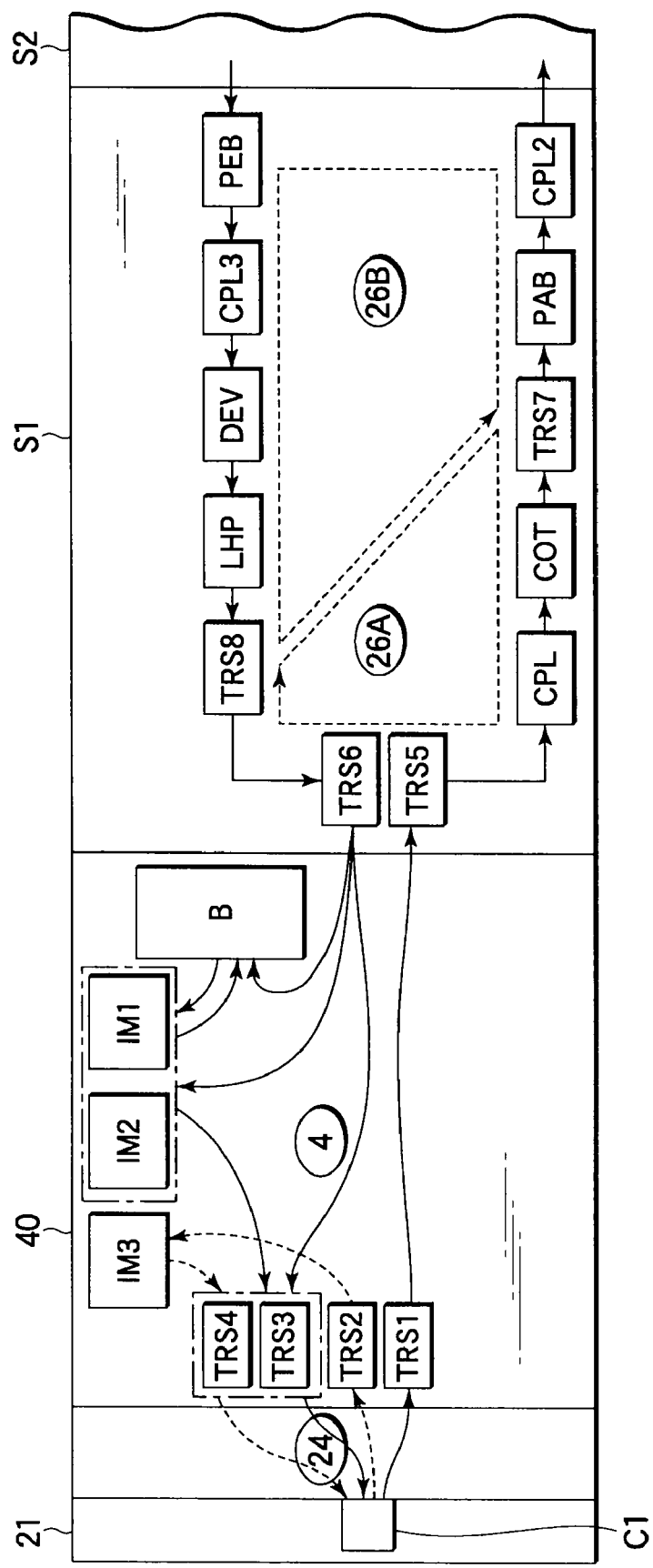
FIG. 9 is a view showing other transfer routes used for executing the parallel transfer mode in the coating/developing apparatus.
Figure 10:
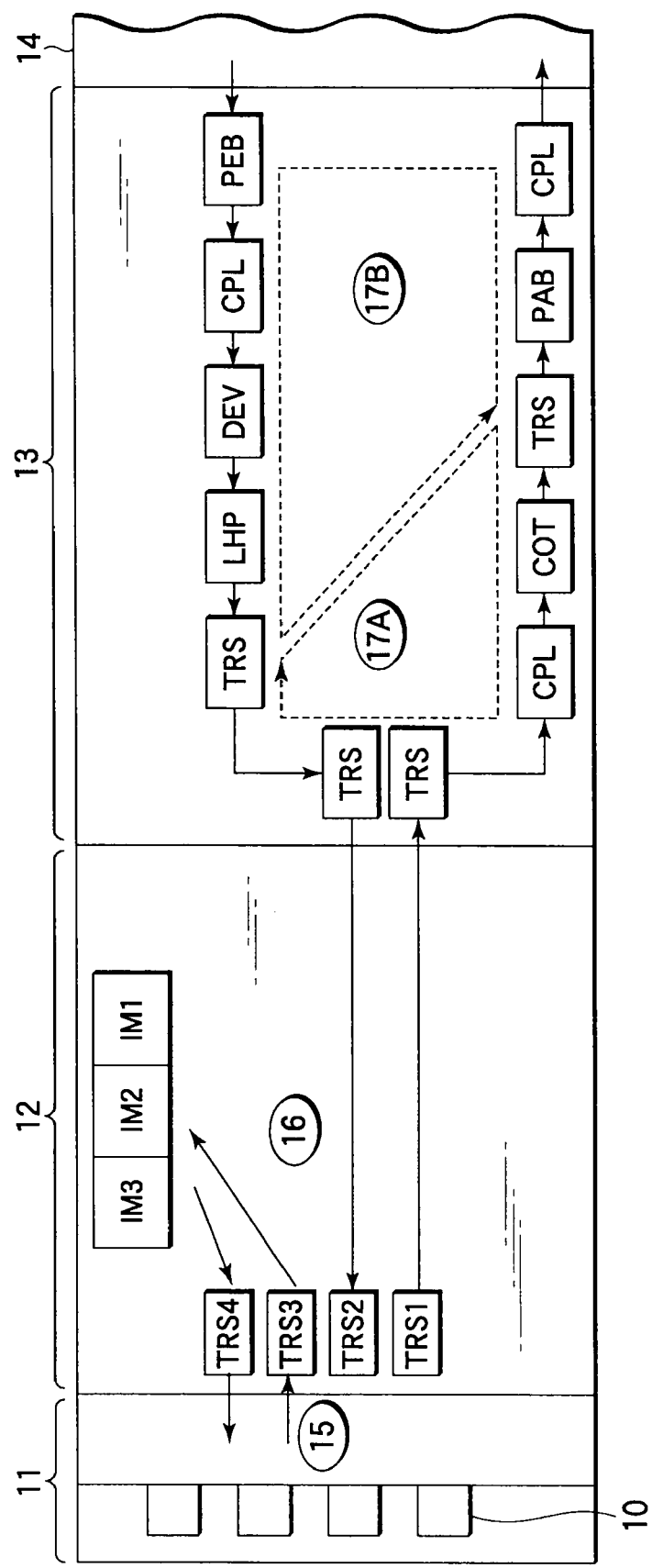
FIG. 10 is a view showing transfer routes used in a conventional coating/developing apparatus

As shown in FIG. 9, the following transfer may be used for wafers W from one carrier C. At first, as in the production mode of the embodiment described above, after the coating and developing processes are finished, wafers W examined by the examination module IM1 or IM2 and wafers W not examined by either of the examination modules IM1 and IM2 are returned through the transfer stage TRS3 or TRS4 into the carrier C, as shown by solid lines in FIG. 9. Then, for the wafers W thus returned into the carrier C, a judgment is made by the control section 100 of whether or not each wafer W has been preset to be examined by the examination module IM3. If the wafer W is judged as having been preset to be examined, the wafer W is transferred through a route of "TRS2→IM3→TRS3 or TRS4→carrier C", as show by broken lines in FIG. 9. Even with this transfer, the wafers W are prevented from being stuck within the examination block 40, as in the embodiment described above. Alternatively, it may be arranged such that wafers W from the carrier C are transferred in accordance with the examination flow described above and are examined by the examination module IM3, then the wafers W are returned into the carrier C, and then the wafers W are transferred to the process block S1 and are processed by coating and development.

According to the embodiments of the present invention, substrates are processed in a process block including a plurality of processing modules for performing resist coating and development, and are then partly transferred to an examination module, while other substrates are transferred from a carrier through the second stage to an examination module. These substrates can be transferred to either one of the third and fourth stages, so that the transfer paths for substrates examined by the examination modules are not limited to one stage. Accordingly, even if the examinations of the examination modules are finished at the same time, transfer of substrates to and from the third and fourth stages can be flexibly adjusted, so that the substrates are prevented from being stuck in the examination modules due to the third and fourth stages being occupied, and the throughput is thereby prevented from being lowered.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coating/developing apparatus comprising:
a carrier block configured to place therein a carrier that stores a plurality of substrates, and including a first transfer device configured to transfer substrates to and from the carrier;
a process block including a plurality of processing modules configured to perform resist coating on substrates transferred from the first transfer device and to perform development on substrates processed by the resist coating and light exposure, and a device configured to transfer substrates to and from the processing modules;
an examination block including a plurality of examination modules configured to perform examinations on substrates, and a second transfer device configured to transfer substrates to and from the examination modules;
a first stage, a second stage, a third stage, and a fourth stage configured to allow substrates to be transferred between the first transfer device in the carrier block and the second transfer device in the examination block;
a controller configured to control the first transfer device in the carrier block and the second transfer device in the examination block,
wherein the controller includes a function of executing a first operation mode preset to transfer substrates from the process block and substrates from the carrier block into the examination block in parallel, and
the first operation mode comprises
transferring substrates processed by the process block to either one of the third and fourth stages through or not through at least one of the examination modules by the second transfer device,
transferring substrates to be only examined from a carrier in the carrier block to the second stage by the first transfer device, and transferring these substrates from the second stage to at least one of the examination modules by the second transfer device, and
transferring substrates thus examined from the examination block to either one of the third and fourth stages by the second transfer device.

2. The coating/developing apparatus according to claim 1, wherein the first operation mode comprises selecting empty one of the third and fourth stages to transfer a substrate thereto by the second transfer device.

3. The coating/developing apparatus according to claim 1, wherein the controller further includes a function of executing a second operation mode preset to transfer substrates only from the process block into the examination block, and a mode selection part configured to select one of the first and second operation modes, and the second operation mode comprises transferring substrates processed by the process block to any one of the second, third, and fourth stages through or not through at least one of the examination modules by the second transfer device.

4. The coating/developing apparatus according to claim 1, wherein the second operation mode comprises selecting empty one of the second, third, and fourth stages to transfer a substrate thereto by the second transfer device.

5. The coating/developing apparatus according to claim 1, wherein a fifth stage and a sixth stage are disposed between the process block and the examination block, and the controller is preset to perform transferring a substrate from the first stage to the fifth stage by the second transfer device, and transferring a substrate processed by the process block through the sixth stage to the second transfer device.

6. The coating/developing apparatus according to claim 1, wherein the first operation mode comprises transferring substrates to be processed by the process block from a carrier in the carrier block to the first stage by the first transfer device, and transferring these substrates from the first stage to the process block by the second transfer device.

7. The coating/developing apparatus according to claim 3, wherein the controller further includes a carrier identification part configured to identify a first carrier that stores substrates to be processed by the process block and a second carrier that stores substrates to be only examined, and the mode selection part is configured to select an operation mode in accordance with a result of identification of the first and second carriers.

8. The coating/developing apparatus according to claim 7, wherein the mode selection part is configured to switch the second operation mode to the first operation mode in response to placement of the second carrier in the carrier block while substrates from the first carrier are treated.

9. The coating/developing apparatus according to claim 3, wherein the controller further includes a function of executing a third operation mode preset to transfer substrates only from the carrier block into the examination block, the mode selection part is configured to select one of the first, second, and third operation modes, and the third operation mode comprises transferring substrates to be only examined from a carrier in the carrier block to the second stage by the first transfer device, and transferring these substrates from the second stage to at least one of the examination modules by the second transfer device, and transferring substrates thus examined from the examination block to either one of the third and fourth stages by the second transfer device.

10. The coating/developing apparatus according to claim 9, wherein the controller further includes a carrier identification part configured to identify a first carrier that stores substrates to be processed by the process block and a second carrier that stores substrates to be only examined, and the mode selection part is configured to select an operation mode in accordance with a result of identification of the first and second carriers, and wherein the mode selection part is configured to switch the second or third operation mode to the first operation mode in response to placement of one of the first and second carriers in the carrier block while substrates from the other of the first and second carriers are treated, and, thereafter to switch the first operation mode to the second or third operation mode in response to a state where a process on substrates from one of the first and second carriers is finished before a process on substrates from the other of the first and second carriers is finished.

11. An operation method of a coating/developing apparatus that comprises a carrier block configured to place therein a carrier that stores a plurality of substrates, and including a first transfer device configured to transfer substrates to and from the carrier, a process block including a plurality of processing modules configured to perform resist coating on substrates transferred from the first transfer device and to perform development on substrates processed by the resist coating and light exposure, and a device configured to transfer substrates to and from the processing modules, an examination block including a plurality of examination modules configured to perform examinations on substrates, and a second transfer device configured to transfer substrates to and from the examination modules, and a first stage, a second stage, a third stage, and a fourth stage configured to allow substrates to be transferred between the first transfer device in the carrier block and the second transfer device in the examination block, the operation method comprising executing a first operation mode preset to transfer substrates from the process block and substrates from the carrier block into the examination block in parallel, wherein the first operation mode comprises:

transferring substrates processed by the process block to either one of the third and fourth stages through or not through at least one of the examination modules by the second transfer device;

transferring substrates to be only examined from a carrier in the carrier block to the second stage by the first transfer device, and transferring these substrates from the second stage to at least one of the examination modules by the second transfer device; and transferring substrates thus examined from the examination block to either one of the third and fourth stages by the second transfer device.

12. The operation method according to claim 11, wherein the first operation mode comprises selecting empty one of the third and fourth stages to transfer a substrate thereto by the second transfer device.

13. The operation method according to claim 11, wherein the operation method further comprises executing a second operation mode preset to transfer substrates only from the process block into the examination block, and selecting one of the first and second operation modes, and the second operation mode comprises transferring substrates processed by the process block to any one of the second, third, and fourth stages through or not through at least one of the examination modules by the second transfer device.

14. The operation method according to claim 11, wherein the second operation mode comprises selecting empty one of the second, third, and fourth stages to transfer a substrate thereto by the second transfer device.

15. The operation method according to claim 11, wherein a fifth stage and a sixth stage are disposed between the process block and the examination block, and the operation method further comprises transferring a substrate from the first stage to the fifth stage by the second transfer device, and transferring a substrate processed by the process block through the sixth stage to the second transfer device.

16. The operation method according to claim 11, wherein the first operation mode comprises transferring substrates to be processed by the process block from a carrier in the carrier block to the first stage by the first transfer device, and transferring these substrates from the first stage to the process block by the second transfer device.

17. The operation method according to claim 13, wherein the operation method further comprises identifying a first carrier that stores substrates to be processed by the process block and a second carrier that stores substrates to be only examined, and selecting an operation mode in accordance with a result of identification of the first and second carriers.

18. The operation method according to claim 17, wherein the operation method further comprises switching the second operation mode to the first operation mode in response to placement of the second carrier in the carrier block while substrates from the first carrier are treated.

19. The operation method according to claim 13, wherein the operation method further comprises executing a third operation mode preset to transfer substrates only from the carrier block into the examination block, and selecting one of the first, second, and third operation modes, and the third operation mode comprises:

transferring substrates to be only examined from a carrier in the carrier block to the second stage by the first transfer device, and transferring these substrates from the second stage to at least one of the examination modules by the second transfer device; and transferring substrates thus examined from the examination block to either one of the third and fourth stages by the second transfer device.

20. A computer readable storage medium that stores a program for execution on a computer used for a coating/developing apparatus that comprises a carrier block configured to place therein a carrier that stores a plurality of substrates, and including a first transfer device configured to transfer substrates to and from the carrier, a process block including a plurality of processing modules configured to perform resist coating on substrates transferred from the first transfer device and to perform development on substrates processed by the resist coating and light exposure, and a device configured to transfer substrates to and from the processing modules, an examination block including a plurality of examination modules configured to perform examinations on substrates, and a second transfer device configured to transfer substrates to and from the examination modules, and a first stage, a second stage, a third stage, and a fourth stage configured to allow substrates to be transferred between the first transfer device in the carrier block and the second transfer device in the examination block, wherein the program, when executed, causes the computer to conduct an operation method of the coating/developing apparatus, the operation method comprising executing a first operation mode preset to transfer substrates from the process block and substrates from the carrier block into the examination block in parallel, and the first operation mode comprises:

transferring substrates processed by the process block to either one of the third and fourth stages through or not through at least one of the examination modules by the second transfer device;

transferring substrates to be only examined from a carrier in the carrier block to the second stage by the first transfer device, and transferring these substrates from the second stage to at least one of the examination modules by the second transfer device; and transferring substrates thus examined from the examination block to either one of the third and fourth stages by the second transfer device.

* * * * *